L. H. MULLIKIN.
BRAKE MECHANISM FOR TALKING MACHINE MOTORS.
APPLICATION FILED JUNE 7, 1921.
1,395,726.
Patented Nov. 1, 1921.
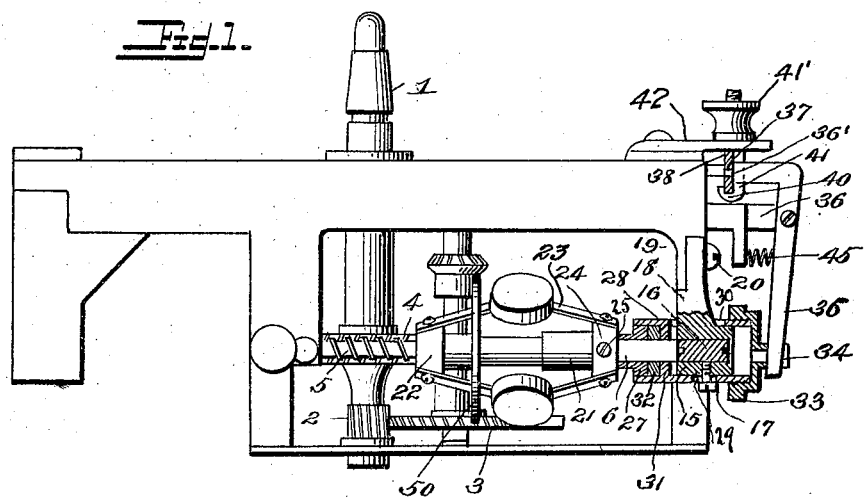
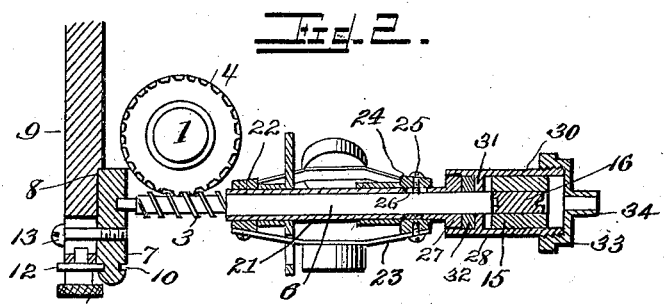
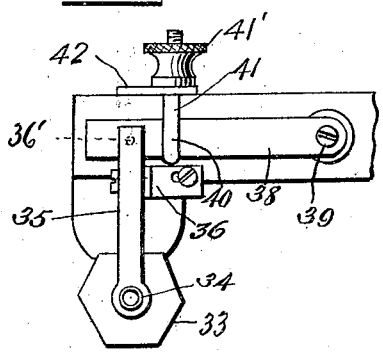
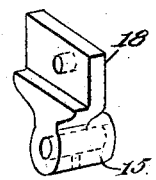
Inventor
L. H. Mullikin
Geo. H. Evans
By
Attorney

UNITED STATES PATENT OFFICE.

LEVIN H. MULLIKIN, OF EASTON, MARYLAND.

BRAKE MECHANISM FOR TALKING-MACHINE MOTORS.

1,395,726.   Specification of Letters Patent.   Patented Nov. 1, 1921.

Application filed June 7, 1921. Serial No. 475,705.

*To all whom it may concern:*

Be it known that I, LEVIN H. MULLIKIN, a citizen of the United States, residing at Easton, in the county of Talbot and State of Maryland, have invented certain new and useful Improvements in Brake Mechanism for Talking-Machine Motors, of which the following is a specification.

My invention relates to braking mechanism for talking machine motors.

The object of the invention is to provide an automatic braking mechanism which will be simple in construction, effective in operation and which will be practically noiseless.

This object I accomplish by the construction shown in the accompanying drawing, in which:

Figure 1 is a front elevation of my improved braking mechanism partly in section.

Fig. 2 is a sectional plan view.

Fig. 3 is a detail end elevation.

Fig. 4 is a detail perspective of the centrally bored bearing which supports the sliding brake sleeve.

The vertical shaft 1 carries the usual horizontal table, not shown, and is provided at its lower end with a worm 2 meshing as usual with a worm wheel 3 driven from a motor, not shown.

The table shaft 1 is provided with a worm wheel 4 meshing, as usual, with the worm 5 on the inner end of the governor shaft 6. This inner or left hand end of the governor shaft is mounted in a transverse, removable bearing block 7, which in turn is mounted in a horizontal guideway 8 formed in a depending arm 9 of the frame.

The outer end of the block 7 is provided with an annular recess 10 engaged by an annular flange 12 formed on the knurled screw 11. By turning the screw 11 the block 7 may be adjusted to bring the worm 5 into proper relation to its driving worm wheel 4. The block 7 is further held when adjusted by a clamp screw 13 at right angles to the adjusting screw 11. The block 7 may be removed with shaft 6 and its attached parts whenever such action is found to be necessary.

The outer or right hand end of the governor shaft 6 is mounted in a centrally bored fixed bearing 15, provided within its bore with an adjustable bearing plug 16, the inner end of which forms the bearing point of the inner end of said shaft 6.

A set-screw 17 secures the plug 16 in its adjusted position within the bearing 15. The bearing 15 is cylindrical on its exterior and is formed upon or secured to a bracket or arm 18 secured at its upper end to a depending lug 19 on the motor frame by means of a screw 20.

The governor shaft 6 is provided with a long loose brake sleeve 21 free to slide longitudinally along said shaft and provided at its inner or left hand end with a collar 22 to which the adjacent ends of the weighted springs 23 of the speed responsive means are secured; the outer or right hand ends of said springs 23 being secured to a fixed collar 24 held to the shaft 6 against all movement by means of set-screws 25 which at their inner ends project through longitudinal slots 26 in the brake sleeve 21, one slot only being shown. The slots 26 and inner ends of set-screws 25 allow the brake sleeve 21 to slide through the fixed collar 24 as the weighted arms or springs 23 are moved in and out by centrifugal action. The outer or right hand extremity of the brake sleeve 21 is provided with the annular braking member 27 which lies next to the inner end of a tubular non-rotating brake adjusting slide 28 mounted to slide on the bearing 15; the slide 28 having a slot 29 to allow it to slide across the screw 17 and a second slot 30 to allow it to slide across the arm or bracket 18. These slots, together with screw 17 and bracket 18, hold the brake slide 28 from rotating on the bearing 15. The brake slide 28 has a centrally apertured partition 31 next to the braking member 27 and within the recess or socket formed by said partition is placed a leather or like braking washer 32 with which the braking member 27 coöperates. The plug 16 and bearing 15 are at the other side of the partition 31. The outer end of the tubular brake adjusting slide 28 is closed by a centrally apertured cap 33, which also closes the outer end of the slot 30 and prevents slide 28 from accidental displacement.

The cap 33 has a nipple 34 around its central aperture and this nipple projects into the lower apertured end of a bell crank lever 35 pivoted to an arm 36 on the motor frame and pressed away from slide 28 and its end cap 33 by a spring 45. The upper shorter arm of lever 35 has a pin 36 at its inner end entering an aperture 37 in a vertically adjustable arm 38 pivoted at one end to the motor frame, as at 39. The lower edge of this arm 38 is engaged by the lower hooked end 40 of a vertically adjustable screw 41 passed loosely through an arm 42 projecting from the motor frame, and having an adjusting nut 41' on its upper threaded end. By making the nipple 34 tubular a small screw driver may be passed therethrough into a nick in the outer end of plug 16 so that by loosening the screw 17 the plug may be rotated to take up any slight inequality at the point engaged by the outer end of shaft 6.

It will be seen that as the speed responsive elements fly out a pull to the right will be exerted at 22 upon the brake sleeve 21 so that the right hand end or braking end 27 of said sleeve will be forced into braking contact with washer 32 and so the adjusting sleeve 28 will be moved to the right until stopped by the lever 35 at any predetermined point. All braking is in line with and concentric with the axis of the governor shaft, so that there can be no tilting of one of the braking surfaces with respect to the other.

Furthermore, it will be seen that in this type of governor shaft the pull on the worm 5 by worm wheel 4 tends to force the shaft to the left and my tests show that the speed responsive devices should not tend to move the shaft in an opposite direction, as these two opposite movements tend to produce the unpleasant sounds so frequently found in motors of this type. Hence the long sleeve 21 will in moving to the right cause the opposite fixed ends of the springs 23 to exert a pull to the left on shaft 6 through the collar 24, which is fixed to the right hand end of the said shaft 6.

Thus all longitudinal strains on the shaft 6 are to the left; that is, in the same direction, and so the noise due to opposing longitudinal lines of strain is overcome.

The sleeve 21 may be provided with an annular flange 50, if desired, said flange having apertures 51 for the springs 23. This flange acts as a sort of fly wheel in steadying the movement of the parts.

What I claim is:

1. The combination with the governor shaft and its sliding speed responsive sleeve, of a non-revoluble tubular brake slide concentric with said shaft and sleeve, co-acting braking members on the sleeve and slide, a fixed cylindrical bearing for said slide, and adjusting means at the outer end of the said slide to set it and the braking members in effective relation.

2. The combination with the governor shaft and its sliding speed responsive sleeve, of a non-revoluble tubular brake slide concentric with said shaft and sleeve, co-acting braking members on the adjacent ends of the sleeve and slide, a fixed bearing on the exterior of which said braking slide is mounted and provided with a central bore, an adjustable bearing plug for the adjacent end of the governor shaft within said bore, and an adjusting means or stop centrally of the outer end of said brake slide to set the brake slide in proper relation to the braking member upon the said sleeve.

3. The combination with the governor shaft and its sliding speed responsive sleeve having an annular braking member at its free end, of a non-revoluble tubular slotted brake slide provided at its adjacent end with an annular co-acting braking member, a cylindrical bearing on which the brake slide is mounted and provided with a supporting member extending through said slot, a cap on the outer end of the brake slide, and an adjusting device engaging the center of the cap to set the brake slide in relation to the braking member on the said sleeve.

4. The combination with the governor shaft and its speed responsive sleeve having an annular braking member at its free end, of a non-revoluble tubular brake slide provided at its adjacent end with an annular co-acting braking member, and having two longitudinal slots, a cylindrical bearing on which the brake slide is mounted and provided with a supporting arm extending through one of said slots, a bearing plug for the adjacent end of the governor shaft within said tubular bearing, a set-screw extending through the other of said slots and through the tubular bearing into engagement with said plug, and means for adjusting the brake slide to bring its braking member into proper relation to the braking member on said sleeve.

5. The combination with the governor shaft and its sliding speed responsive sleeve, of a non-revoluble tubular brake slide concentric with said shaft and sleeve, co-acting annular braking members on the adjacent ends of the sleeve and slide, a fixed tubular bearing on the exterior of which the slide is mounted, an adjustable bearing plug, for the adjacent end of the governor shaft, mounted within the said bearing, a cap closing the outer end of the brake slide and having a central opening through which the bearing plug may be adjusted, and means for adjusting the brake slide along its bearing to bring the braking members into proper relation.

6. The combination with the governor shaft and its sliding speed responsive sleeve, of a non-revoluble tubular brake slide concentric with the said shaft and sleeve, co-acting annular braking members on the adjacent ends of the sleeve and slide, a fixed tubular bearing on which the tubular slide is mounted, an adjustable bearing plug within said bearing and engaged by the end of the governor shaft, a cap for the outer end of the brake slide having a central apertured collar, and an adjusting lever having an opening receiving said apertured collar.

7. The combination with the governor shaft and the sliding speed responsive sleeve thereon, an adjustable bearing block for the driven end of the shaft, an adjusting screw having an interlocking collared connection with the outer end of the block for adjusting it, a set-screw for the block, a centrally bored cylindrical bearing having an adjustable bearing plug for the other end of the shaft, a slotted tubular brake slide on the exterior of said cylindrical bearing, opposed annular braking members on the adjacent ends of the said sleeve and slide, a cap on the outer end of the brake slide, and means for adjusting the brake slide to bring the two braking members into proper relation.

8. The combination with the governor shaft and its speed responsive sleeve, of a non-revoluble tubular brake slide, opposed annular braking members on the adjacent ends of the sleeve and slide, a fixed cylindrical bearing on which said slide is mounted, a central projection on the outer end of the brake slide, a bell crank lever one arm of which engages said projection, and means for adjusting the sleeve to move the brake slide longitudinally and bring the braking members into proper relation.

9. The combination with the governor shaft having a worm at one end, a speed responsive sleeve loose on the shaft, speed responsive means connected at one point with that end of the sleeve next to the worm to slide the sleeve and rigidly connected at another point with the other end of the shaft, an annular braking member on the extremity of the sleeve beyond said fixed connection of the speed responsive means, of a non-revoluble tubular brake slide having an annular braking member on its inner end opposing the first named braking member, a bearing on which the brake slide is mounted, and means for adjusting the brake slide longitudinally to bring the braking members into proper relation.

10. The combination with the governor shaft having a driving worm, a sliding sleeve loose on the said shaft and provided at its end opposite the worm with a longitudinal slot, and an annular braking member, a fixed collar loosely encircling the slotted portion of the sleeve, fastening devices extending through the collar and slots into locking engagement with the shaft, speed responsive means connecting the fixed collar with the opposite end of the sleeve to effect a sliding movement of the sleeve along the shaft, a non-revoluble brake slide having an annular braking member opposed to the braking member on the adjacent end of the sleeve, a bearing for the brake slide and adjacent end of the governor shaft, and means for adjusting the brake slide along the bearing to bring the two annular braking members into proper relation.

11. The combination with the governor shaft having a driving worm at one end, a sliding sleeve extending substantially from end to end of the shaft, slotted at its end farthest from the worm and provided at that end with an annular braking member, a collar on the opposite end of the sleeve, a fixed collar through which the slotted end of the sleeve slides, speed responsive arms connecting the fixed collar with the collar on the sleeve, a tubular non-rotating slotted brake slide having an annular partition, a braking washer between said partition and the braking member on the sliding sleeve, a tubular bearing on which the brake slide is mounted at the opposite side of the partition, a supporting arm for said bearing extending through said slot in the slide, a bearing plug in the tubular bearing for the end of the governor shaft, and means for adjusting the brake slide along its bearing.

12. The combination with the governor shaft provided with a worm at one end and a sliding sleeve on the shaft having an annular braking member at its end opposite said worm, speed responsive means connected at one end to the end of the sleeve next to said worm, a fixed collar on the other end of the worm shaft to which the speed responsive means is also connected to cause the sleeve to slide away from the worm, of a brake slide movable toward and from the braking end of said sleeve and provided next thereto with an annular braking member, and means for adjusting the brake slide toward the braking end of the said sleeve to bring the two opposed annular braking members into proper relation.

In testimony whereof I affix my signature.

LEVIN H. MULLIKIN.